United States Patent Office 3,005,687
Patented Oct. 24, 1961

3,005,687
PROCESS FOR THE PRODUCTION OF
SULFURIC ACID
Marvin J. Udy, Niagara Falls, N.Y., assignor, by mesne assignments, to Strategic Materials Corporation, New York, N.Y., a corporation of New York
No Drawing. Filed Apr. 4, 1956, Ser. No. 575,933
7 Claims. (Cl. 23—168)

This invention relates to a new and improved process for the production of sulfuric acid. More particularly, the invention contemplates the provision of a novel cyclic process for the production of sulfur trioxide or sulfuric acid anhydride by oxidation or conversion of sulfur dioxide and subsequent utilization of the sulfur trioxide thus produced in the production of sulfuric acid by absorption in concentrated sulfuric acid or similar conventional techniques.

Possibly but few other phases of inorganic chemistry have been investigated as thoroughly over so long a period of time as that pertaining to the sulfur oxides, and, in particular, the application of these compounds to the production of sulfuric acid. The reports of researches dating from the seventeenth century through present day practices are so profuse and exhaustive as to render impossible any attempted brief summation of this art but, for the most part, by far the most extensive phase of this research has been that pertaining to methods and procedures for effecting the economical oxidation or conversion of the relatively readily obtainable dioxide of sulfur to its trioxide form. Significantly, in spite of the exhaustive nature of this research work, only two basic processes involving oxidation of sulfur dioxide to sulfur trioxide are presently employed on any substantial scale by industry in the commercial production of sulfuric acid, namely, the chamber process and the contact process, both of which are catalytic in nature and utilize air as the source of oxygen for the formation of sulfur trioxide. In the chamber process, oxidation is effected by the catalytic action of nitrogen oxides on moist sulfur dioxide within special leaden reaction chambers, whereas in the contact process the reaction is one of conventional contact catalysis involving the use of a homogeneous or heterogeneous catalyst such as platinum or platinum deposited on a suitable carrier or support such as asbestos or alumina, or, vanadium oxides such as vanadium pentoxide, and a great many other substances of somewhat lesser importance.

The cyclic process of the present invention is based upon my discovery that the conversion of sulfur dioxide to sulfur trioxide in constant yields within the range of seventy-five percent to ninety-five percent (75-95%) $SO_3$, may be effected quite readily within an indirectly heated tube or muffle-kiln type furnace supplied with a charge of sized quartz or metallic oxide, such, for example, as iron oxide, alumina, titania, nickel oxide, zinc oxide, copper oxide, cobalt oxide and similar compounds maintained at a temperature of about 750° C., and in the presence of air or oxygen and/or carbon dioxide.

The fact that substantial yields of sulfur trioxide may be produced and recovered by the process of the invention involving conversions at a temperature of the order of 750° C. or higher, is not to be expected since the basic reaction from sulfur dioxide to sulfur trioxide by simple oxidation in the absence of a catalyst, i.e. $2SO_2+O_2 \rightleftharpoons 2SO_3$, is an exothermic reversible reaction wherein the conversion of sulfur dioxide is said to decrease with an increase in temperature above approximately 434° C. That is to say, at temperatures within the range 400-450° C. the nature of the equilibrium between the reactants and end-product is such that satisfactory yields can be obtained, but the rate of reaction or the rate of attainment of this equilibrium is so slow as to render the basic reaction unsuitable for commercial purposes. On the other hand, whereas the rate of direct reaction, $2SO_2+O_2 \rightarrow 2SO_3$, may be increased by increasing the temperature, the reverse reaction, $2SO_3 \rightarrow 2SO_2+O_2$, becomes appreciable at temperatures within the range 550–600° C., and the percent conversion of sulfur dioxide to sulfur trioxide decreases to approximately forty-five percent (45%) at 700° C. and less than one percent (1%) at 1100° C. Of course, in actual commercial practice within the contact process described above, the catalysts such as platinum or vanadium pentoxide, among others, are employed to increase the rate of reaction, but the temperature of reaction is still maintained within the order of that given above for the uncatalyzed reaction at preferred equilibrium conditions, since it has been found that whereas the catalytic activity or rate of conversion increases more and more rapidly as the temperature is increased, the percentage conversion reaches a maximum within the range 400–550° C. for most commercial catalysts, and falls off rapidly at temperatures above this range. Apart from these considerations, however, the high yields of sulfur trioxide obtained within the process of the present invention are not predictable nor explainable on the basis of known contact catalysis phenomena alone, such as might be attributable to the presence of the quartz or a metallic oxide within the system, since the catalytic activity of ferric oxide, for example, in the formation of sulfur trioxide, is perceptible at temperatures within the range 400°–620° C. with optimum conversions (65–75%) occurring at temperatures within the range 600–620° C., but the percentage conversion decreases rapidly above 620° C. and is less than fifty percent (50%) at approximately 675° C. Furthermore, whereas it has been proposed heretofore to employ carbon dioxide in the general oxidation reaction of sulfur dioxide, such use was intended, in theory at least, to supply a so-called "chemical refrigerant" to the system, that is, a compound (carbon monoxide) forming during the reaction and capable of absorbing heat upon formation such that the heat evolved during the formation of sulfur trioxide would be absorbed by the compound to prevent the overall reaction temperature (under conditions of continuous operation) from rising above values at which the sulfur trioxide could be expected to revert to the dioxide form. Here again, however, this reaction is conducted and closely controlled to temperatures within the range 400–450° C., i.e., well below the temperature employed within the cyclic process of my invention for maximum conversions and recovery of sulfur trioxide.

The fact that the unexpectedly high-yields of sulfur trioxide recoverable in accordance with the process of the invention may be caused, at least in part, by some form of surface effect produced by the solid phase of the system (quartz or metallic oxide substance), has been demonstrated within a static-type $SO_3$-converter operated in accordance with the principles of the invention, wherein, a stationary column of the quartz of metallic oxide maintained at a temperature of about 750° C. and contacted with a continuous through-flow of sulfur dioxide, air and carbon dioxide, provides initial typical high yields of sulfur trioxide which uniformly begin to drop-off slowly after approximately three (3) hours of continuous operation. On the other hand, this phenomenon is apparently not the result of catalytic fatigue or poisoning of the solid phase in the conventional sense, since the desirable function of the solids has been proven to be totally self-regenerative and the same high initial yields of $SO_3$ have been readily re-established in such a static system by simply leaving the quartz or metallic oxide idle for several hours. Furthermore, examination of the quartz or metallic oxide substance immediately following a drop-off of this type demonstrated the same optimum temperature conditions, no increase in elemental sulfur content over that present at the start of the run, and no evidence of the presence of other contaminants or agents known to bring about catalytic fatigue of conventional catalysts. Furthermore, it has also been demonstrated that the function of the solid phase within the system is not the exclusive causative factor responsible for the high yields of sulfur trioxide, in that, conversions of sulfur dioxide to sulfur trioxide in the order of seventy-five percent (75%) have been obtained for periods in excess of one hour by use of an empty stainless steel tube-type reactor heated to an internal atmosphere of 750° C. and supplied with a through-flow of sulfur dioxide, oxygen and carbon dioxide. The percentage yield is enhanced, however, by the presence of the quartz or a metallic oxide substance of the general class defined, and the fact that the percentage conversions begin to drop-off within a static system after about three (3) hours of continuous operation is of no significance insofar as concerns the preferred cyclic embodiment of my invention for the reason that I maintain a continuously moving column of the solid quartz or metallic oxide within the tube-type furnace based upon an overall exchange cycle of approximately two and one-half to three (2½–3) hours, such that the solid phase is completely renewed within this period and the yields of sulfur trioxide remain uniformly high during continuous operation of the process. Alternatively, I find that I may operate with two (or more) static $SO_3$-converter units each containing a stationary column of quartz or metallic oxide and operating alternately on a two and one-half to three (2½–3) hours cycle with each unit while the other (or others) remain on standby, so to speak, and such an arrangement also provides uniformly high yields of sulfur trioxide on an indefinite basis.

In practicing the process of the invention, the sulfur dioxide gas and addition gas or gases consisting of air or oxygen and/or carbon dioxide are passed into the reaction zone of an indirectly heated tube or muffle-kiln furnace containing the finely-divided quartz or metallic oxide heated to the optimum $SO_3$-conversion temperature of 750° C., and thence through the solid phase to the opposite end of the furnace where the resulting sulfur oxide gases, consisting predominantly of sulfur trioxide, are removed and passed to a conventional absorption tower for recovery of the $SO_3$-content by absorption in concentrated sulfuric acid. The sulfur dioxide gas recovered from the absorption tower is then recycled for another pass through the converter furnace; the process being continued in this manner on a cyclic basis. In the preferred embodiment of the invention utilizing a dynamic or continuously moving solid phase within the $SO_3$-converter, I prefer to pass the hot quartz or hot metallic oxide in countercurrent flow with respect to the sulfur dioxide, air or oxygen and/or carbon dioxide, but I have found that a cocurrent relationship or flow of the solid phase and gases causes no appreciable decrease in the ultimate yield of sulfur trioxide. The best yields of sulfur trioxide are obtained when carbon dioxide and oxygen are passed into the converter furnace simultaneously, but practically equivalent yields may be obtained when carbon dioxide and air are employed in admixture. The conversions obtained with carbon dioxide alone, however, are substantially less (65%) than those obtained with oxygen or air and carbon dioxide, whereas the conversions with oxygen or air alone average about seventy-five to eighty-five percent (75–85%). Accordingly, on the basis of yields and economy of operation, I prefer to employ air and carbon dioxide; obtaining conversions within the order of seventy-five to ninety-five percent (75–95%). The actual amounts of air and carbon dioxide required within a system of given capacity may be readily established by simply varying the flow of each gas to the converter furnace until maximum yields of sulfur trioxide are established within the sulfur oxide gases recovered from the converter. The flow rates do not appear to be critical nor based upon any fixed proportion of the respective gases which I have been able to establish in my investigations to date, but rather, once maximum conditions of yield are established for a system the addition, within reasonable limits, of increaesd quantities of either gas does not appear to enhance the yields of sulfur trioxide nor appreciably reduce the yields below the maximum point. I have found, however, that the yields of sulfur trioxide may be enhanced by the presence of a slight amount of moisture within the system, and I prefer to accomplish this by passing one or more o° the gases through water prior to introduction into the $SO_3$-converter furnace. For example, I find it convenient to pass the sulfur dioxide gas through water prior to its passage into the converter, but the desired moisture content could be entrained with any of the other gases for the same effect.

The sulfur dioxide gas employed as a starting material in the process of the invention may be obtained from any of the conventional sources, i.e., by the combustion of sulfur, by heating zinc blende or pyrites in air, by the decomposition of metallic sulfates, by the combustion of hydrogen sulfide, etc. The quartz may be of any conventional grade, preferably sized to about one-eighth inch for optimum results, whereas the metallic oxide substances may be of the types recovered by reduction from raw ores or by decomposition of a corresponding metallic sulfate, such, for example, as iron oxide ($Fe_2O_3$) from ferrous sulfate, titania from titanium sulfate, alumina from aluminum sulfate, etc., and preferably sized to approximately one-quarter inch or less. In my copending application Serial No. 576,151, now abandoned, filed of even date and entitled, "Process and Apparatus for the Treatment of Metallic Sulfates," I have described and claimed a cyclic process for the treatment of metallic sulfates for the recovery of their corresponding metallic oxides, and recovery of their sulfur values in the form of sulfuric acid. The acid regeneration phase of the process of my aforementioned copending application is based upon the principles of the present invention, whereas the metallic oxides produced by that process are ideally suited for use in the $SO_3$-converter of the present process. A typical furnace or converter for use in practicing the process of the present invention is described and illustrated in said copending application, but any of the indirectly heated commercially available tube or kiln type furnaces will provide satisfactory results when operated in accordance with the foregoing principles.

It should be pointed out that the process has been practiced at various temperatures within the range of 750° C. to 1000° C., the latter temperature representing the maximum practical temperature from the standpoint of percentage conversions of sulfur trioxide, but the yields at or about a temperature of 750° C. are so vastly superior to those obtained at other temperatures within this overall range, that I prefer to operate substantially exclusively within the close vicinity of this temperature.

The following examples illustrate the specific application of the foregoing principles and objects of the invention to the production and recovery of sulfuric acid anhydride and sulfuric acid:

EXAMPLE I

Iron oxide ($Fe_2O_3$)

A well-insulated tube-type furnace provided with electrical (indirect) resistance heating and measuring two inches (I.D.) by two and one-half feet in length, was filled with about five inches of a sized (⅛") ferric oxide product obtained by decomposing a ferrous sulfate waste residue according to the process of my copending application Serial No. 576,151, now abandoned. Thereafter, the ferric oxide was heated to 750° C. and maintained at that temperature throughout the run.

Moist sulfur dioxide was passed into the tube furnace at a flow rate of 0.0012 cubic feet per minute, and oxygen ($O_2$) and carbon dioxide were supplied to the furnace at flow rates of 0.003 and 0.0106 cubic feet per minute, respectively. Conversions to sulfur trioxide averaged ninety-two percent (92%) over a three (3) hour period. Thereafter, the conversion cycle was repeated in the static system with moist sulfur dioxide at a flow rate of 0.0012 cubic feet per minute and air and carbon dioxide were supplied to the furnace at flow rates of 0.015 and 0.010 cubic feet per minute, respectively, with conversion percentages of eighty-nine percent (89%) being obtained over a three (3) hour period. When the cycle was repeated with moist sulfur dioxide at a flow rate of 0.0014 cubic feet per minute and carbon dioxide (0.0096 c.f.m.) alone, the conversions averaged only sixty-five percent (65%) over a three (3) hour period. Air or oxygen alone with moist sulfur dioxide gave fairly high yields averaging approximately eighty-two percent (82%) over three (3) hour cycles.

The conversion cycle employing air (0.003 c.f.m.), carbon dioxide (0.0106 c.f.m.), and moist sulfur dioxide (0.0012 c.f.m.), was repeated in the same furnace at 750° C. on a dynamic basis involving exchange of the ferric oxide on approximately a two and one-half hour (2½) schedule with the depth of ferric oxide being maintained between five to eight inches (5–8″) within the heated zone of the furnace. The yields of sulfur trioxide averaged about ninety-three percent (93%) over an eight (8) hour run. In all cases, the recoveries of sulfur trioxide were by absorption in concentrated $H_2SO_4$.

EXAMPLE II

Quartz

The static converter equipment employed in Example I was charged with approximately five inches (5″) of a sized (⅛″) quartz product and heated to 750° C. Moist sulfur dioxide was supplied to the furnace at a flow rate of 0.0012 cubic feet per minute and air and carbon dioxide at flow rates of 0.015 and 0.0095 cubic feet per minute, respectively. The yields of $SO_3$ over a three (3) hour period averaged about eighty-six percent (86%).

This conversion system was repeated on the basis of a dynamic exchange of the quartz over a two and one-half (2½) hour schedule with the depth of quartz being maintained between five to eight inches (5–8″) within the heated zone of the furnace. The yields of sulfur trioxide over a continuous eight (8) hour run averaged around ninety percent (90%).

EXAMPLE III

Alumina

The conversion equipment of Example I was operated on a dynamic basis with fused alumina based on an exchange cycle for the alumina of approximately two and one-half (2½) hours, with the depth of alumina being maintained at approximately five inches (5″) within the heated (750° C.) zone of the furnace. Sulfur dioxide in moist form was supplied to the converter at a flow rate of 0.0012 cubic feet per minute. Air and carbon dioxide were supplied to the converter at flow rates of 0.003 and 0.0106 cubic feet per minute, respectively. The percentage conversions to sulfur trioxide averaged eighty-seven and two tenths percent (87.2%) over a six (6) hour continuous run.

EXAMPLE IV

Titania

A converter unit was operated in exactly the same manner as that of the preceding examples with titania. Initially, the system was operated on a static basis with a fixed column of titania within the converter. Sulfur dioxide was supplied at a flow rate of 0.00147 cubic feet per minute and air and carbon dioxide at flow rates of 0.013 and 0.010 cubic feet per minute, respectively. During the initial three (3) hours of the static run with the temperature maintained at approximately 756° C., the yields of sulfur trioxide averaged ninety-six and six tenths percent (96.6%). During the next three hours of the static run, with sulfur dioxide supplied at a flow rate of 0.00141 cubic feet per minute, and air and carbon dioxide supplied at flow rates of 0.013 and 0.010 cubic feet per minute, respectively, the yields of sulfur trioxide averaged eighty-nine percent (89%). When the system was converted to a dynamic flow of the solid (titania) phase with a three (3) hour exchange cycle for the titania within the converter, and with the reacting gases, sulfur dioxide, air and carbon dioxide supplied at flow rates of 0.00147, 0.013 and 0.010 cubic feet per minute, respectively, the yields of sulfur trioxide for a total elapsed operating time of six and one-half hours, averaged ninety-four percent (94%).

EXAMPLE V

Nickel oxide

A commercial nickel oxide product was placed within the same converter furnace employed in the preceding examples to a depth of five (5) inches and heated to 750° C. Moist sulfur dioxide, air and carbon dioxide were supplied to the furnace at flow rates of 0.0032, 0.015 and 0.010 cubic feet per minute, respectively, and the conversions to sulfur trioxide averaged eighty-six and three-tenths percent over a three (3) hour run.

The ultimate recovery of sulfur values within the process of the invention may be effected by absorption in concentrated sulfuric acid, or, a Cottrell precipitator may be used in well known manner. Similarly, as pointed out hereinbefore, in lieu of the vertical type tube furnace used in connection with the application of the present process to the treatment of metallic sulfates, and illustrated in the drawings of my aforementioned copending application Serial No. 576,151, now abandoned, any suitable standard furnace installation may be employed as the $SO_3$-converter. For example, a conventional horizontal-type tunnel kiln or muffle furnace may be utilized. Thus, it should be clearly understood that the process of the invention may be practiced with standard equipment, and, in this respect, the process is not subject to the restrictions characteristic of many systems proposed heretofore which require elaborate and expensive custom installations.

On the basis of their low-cost, ready availability, and the high conversions of sulfur trioxide obtained by use of quartz or fused alumina within the converter unit of the invention, these substances are considered to be the preferred agents within the overall group of operative, substances defined hereinbefore, but as will be readily apparent to those skilled in the art, the actual selection of a material for use as the solid phase within the converter unit will be dependent, to some extent, upon the problems peculiar to a specific installation.

While the exact mechanism of reaction involved in the process of the invention is uncertain, it is believed that carbon monoxide is formed during the course of the reaction from the carbon dioxide supply gas, yielding oxygen for oxidation of the sulfur dioxide to sulfur trioxide, whereas the air or oxygen supplied to the system functions to remove the carbon monoxide from the reaction or dilutes this gas to a point where the direct reaction of sulfur dioxide to sulfur trioxide is not reversed by reason of any reducing effect which might normally be expected in the presence of the carbon monoxide gas. It has been further demonstrated, although not as yet established as fact, that the extreme stability of the reaction at the optimum temperature employed, is attributable to the formation of pyrosulfuric acid ($H_2S_2O_7$) by oxidation of the sulfur dioxide in the presence of the moisture supplied to the system, or, the formation of beta-sulfur trioxide ($S_2O_6$) when the converter unit is operated on a dry basis. As pointed out hereinbefore, the reaction is influenced, also, by the presence of the metallic oxide or quartz but apparently not merely in a catalytic sense since the reaction, per se, has been conducted with favorable results in the total absence of such an agent. Rather, it is believed that the action of the oxide or quartz is attributable to a surface effect bringing about more intimate contact of the reacting gases; the cyclic replacement of the oxide or quartz functioning to present new or fresh surfaces on which the reaction takes place at continuous high efficiencies. It is to be clearly understood, of course, that the foregoing theoretical considerations are offered by way of explanation only and are not to be construed as limiting the actual process of the invention as defined within the appended claims.

I claim:

1. In a process for the production of sulfur trioxide by conversion of sulfur dioxide, the improvement that comprises passing a gas consisting essentially of sulfur dioxide in moist form into contact with a substance selected from the group consisting of quartz, iron oxide, alumina, titania, zinc oxide, copper oxide, cobalt oxide and nickel oxide, while said substance is maintained at a temperature of about 750° C., together with a free oxygen-containing gas and carbon dioxide, and recovering mixed sulfur dioxide-sulfur trioxide gases containing sulfur trioxide in a substantial excess.

2. In a process for the production of sulfur trioxide by conversion of sulfur dioxide, the improvement that comprises passing a gas consisting essentially of sulfur dioxide in moist form into contact with a substance selected from the group consisting of quartz, iron oxide, alumina, titania, zinc oxide, nickel oxide, copper oxide and cobalt oxide, while said substance is maintained at a temperature of about 750° C., together with air and carbon dioxide, and recovering mixed sulfur dioxide-sulfur trioxide gases containing sulfur trioxide in a substantial excess.

3. In a process for the production of sulfur trioxide by conversion of sulfur dioxide, the improvement that comprises passing a gas consisting essentially of sulfur dioxide in moist form through a column of a substance selected from the group consisting of quartz, iron oxide, alumina, titania, zinc oxide, nickel oxide, copper oxide and cobalt oxide while said substance is maintained at a temperature of about 750° C. in an indirectly heated furnace, supplying a free oxygen-containing gas and carbon dioxide to the furnace, and recovering a gaseous product from the furnace consisting essentially of oxides of sulfur and containing sulfur trioxide in a substantial excess.

4. A cyclic process for the production of sulfur trioxide by conversion of sulfur dioxide that comprises, passing a continuous supply of a gas consisting essentially of sulfur dioxide in moist form through a cyclically-renewed column of a substance selected from the group consisting of quartz, iron oxide, titania, alumina, nickel oxide, zinc oxide, cobalt oxide and copper oxide while said column is maintained at a temperature of about 750° C. within an indirecty heated furnace, supplying a free oxygen-containing gas and carbon dioxide to the furnace on a continuous basis, and continuously recovering a gaseous product from the furnace consisting essentially of oxides of sulfur and containing sulfur trioxide in a substantial excess.

5. Process as claimed in claim 4 that further comprises continuously separating the sulfur trioxide from sulfur dioxide associated therewith in the gaseous product, and recycling the sulfur dioxide through the furnace.

6. A cyclic process for the production of sulfuric acid that comprises, passing a continuous supply of a gas consisting essentially of sulfur dioxide in moist form through a column of a substance selected from the group consisting of quartz, iron oxide, titania, alumina, nickel oxide, zinc oxide, cobalt oxide, and copper oxide while said column is maintained at a temperature of about 750° C. within an indirectly heated furnace, moving said substance through the furnace in a unidirectional flow to present a cyclically-renewed column thereof to the sulfur dioxide supplying a free oxygen-containing gas and carbon dioxide to the furnace on a continuous basis, continuously recovering quantities of a gaseous product produced within the furnace consisting essentially of oxides of sulfur and containing sulfur trioxide in a substantial excess, treating said gaseous product on a continuous basis for the separation and recovery of sulfur trioxide from sulfur dioxide associated therewith by absorbing the sulfur trioxide within concentrated sulfuric acid, and recycling the sulfur dioxide through the furnace on a continuous basis for conversion of additional quantities of the same to sulfur trioxide.

7. A cyclic process for the production of sulfuric acid that comprises, passing a continuous supply of a gas consisting essentially of sulfur dioxide in moist form through a column of a substance selected from the group consisting of quartz, iron oxide, titania, alumina, nickel oxide, zinc oxide, cobalt oxide, and copper oxide while said column is maintained at a temperature of about 750° C. within an indirectly heated furnace, moving said substance through the furnace in a unidirectional flow to present a cyclically-renewed column thereof to the sulfur dioxide supplying air and carbon dioxide to the furnace on a continuous basis, continuously recovering quantities of a gaseous product produced within the furnace consisting essentially of oxides of sulfur and containing sulfur trioxide in a substantial excess, treating said gaseous product on a continuous basis for the separation and recovery of sulfur trioxide from sulfur dioxide associated therewith by absorbing the sulfur trioxide within concentrated sulfuric acid, and recycling the sulfur dioxide through the furnace on a continuous basis for conversion of additional quantities of the same to sulfur trioxide.

References Cited in the file of this patent

UNITED STATES PATENTS

| 2,136,298 | Harrison et al. | Nov. 8, 1938 |
| 2,142,855 | Lawry | Jan. 3, 1939 |
| 2,146,792 | Brueckmann et al. | Feb. 14, 1939 |

FOREIGN PATENTS

| 982 | Great Britain | May 2, 1854 |
| 15,947 | Great Britain | 1898 |
| 17,266 | Great Britain | 1898 |

OTHER REFERENCES

Miles: "Manufacture of Sulfuric Acid," vol. IV, 1925, D. Van Nostrand Co., New York, page 86.